(12) United States Patent
Dong et al.

(10) Patent No.: US 6,508,188 B2
(45) Date of Patent: Jan. 21, 2003

(54) DRAG-FREE HULL FOR MARINE VESSELS

(76) Inventors: Jim Dong, 2101 E. 7th St., Tucson, AZ (US) 85719; Norman N. Lichtin, 125 Morton St., Newton, MA (US) 02459

( * ) Notice: Subject to any disclaimer, the term of this patent is extended or adjusted under 35 U.S.C. 154(b) by 0 days.

(21) Appl. No.: 09/793,931

(22) Filed: Feb. 27, 2001

(65) Prior Publication Data

US 2002/0117097 A1 Aug. 29, 2002

(51) Int. Cl.⁷ .................................................. B63B 1/34
(52) U.S. Cl. .................. 114/67 R; 114/61.14; 114/312; 440/47; 440/67; 440/95
(58) Field of Search ................................ 114/67 R, 312, 114/61.12, 61.14; 440/67, 95, 38, 47; 60/221

(56) References Cited

U.S. PATENT DOCUMENTS

| | | |
|---|---|---|
| 434,523 A | 5/1890 | Pond |
| 532,220 A | 1/1895 | Thomas |
| 532,221 A | 1/1895 | Thomas |
| 557,835 A | 4/1896 | Lake |
| 586,915 A | 7/1897 | Pond |
| 1,258,428 A | 3/1918 | Marling |
| 1,913,605 A | 6/1933 | Martin |
| 2,091,958 A | 9/1937 | Braga ............................ 115/63 |
| 2,279,827 A | 4/1942 | Lapidovsky ................... 115/63 |
| 2,377,143 A | 5/1945 | Golden .......................... 114/67 |
| 2,586,218 A | 2/1952 | Gazda ............................. 115/1 |
| 3,205,852 A | 9/1965 | Shepard ......................... 115/63 |
| 3,621,803 A | 11/1971 | Foster ............................ 114/67 |
| 3,623,444 A * | 11/1971 | Lang ............................ 114/277 |
| 3,656,450 A | 4/1972 | Farman ......................... 115/63 |
| 3,797,445 A * | 3/1974 | Zeimer ......................... 114/312 |
| 4,605,376 A * | 8/1986 | Aschauer ......................... 415/5 |
| 4,846,091 A | 7/1989 | Ives ............................... 114/270 |

FOREIGN PATENT DOCUMENTS

GB        2223821        4/1990        .......... B64C/21/00

* cited by examiner

Primary Examiner—Sherman Basinger
(74) Attorney, Agent, or Firm—Curtis Harr

(57) ABSTRACT

A reduced drag marine vessel providing a mechanism that will reduce or even eliminate the drag along the water-solid interface at the hull of the marine vessel. This mechanism is made up of a revolving elastic shell which is similar to a donut shaped belt. This belt forms an interior volume which houses rollers and a framework to support the tubular belt which can be further inflated with a gas to counter the hydraulic pressure of the water outside. Finally, this belt may be housed within a rigid outer tubular shell and contain a propeller within its center so as to form a marine nozzle.

8 Claims, 3 Drawing Sheets

DRAG-FREE HULL FOR MARINE VESSELS

BACKGROUND OF THE INVENTION

The present invention relates to an improvement in the design and the method of propelling marine vessels whether they be surface ships or those designed to operate in a submerged configuration. More specifically, the invention described here has the advantages of producing very little drag resistance, of operating at a high degree of efficiency, of being capable higher speeds, and of producing small wakes and a low noise signatures. Additionally, the instant invention is particularly applicable for highspeed marine vessels and especially those that are designed for submerged operation and those employing twin-hull designs. It can also be adapted for marine nozzles for drag reduction.

Most existing designs and the methods employed in the construction of the hulls of marine vessels are based on the use of an immobile watertight hull that is fixedly attached to a solid inner frame. This basic structure is then propelled by an aft propeller that is rotationally driven by an internal drive motor in one direction to force the entire vessel forward or to reverse the direction of propeller rotation which will act to pull the vessel rearward.

As a marine vessel travels through a body of water there is always a relative speed between the outer hull of the vessel and the water that it is in contact with it. This relative speed causes a speed gradient which subsequently causes a resistance that is opposite to the movement of the vessel. The resistance which is commonly known as drag or hydrodynamic drag. According to theory of hydrodynamics, drag resistance is approximately proportional to the square of the velocity. So drag resistance accounts for an important part of the overall resistance when the vessel is traveling at speed exceeding 30 mph.

The use of moving surface to reduce drag has been well established in the prior art with many proffered examples such as that shown by U.S. Pat. No. 532,220 issued to J. Thomas on Jan. 8, 1895 which generally disclosed a mechanism to cover the sides of the ship with revolving belts to reduce friction between the ship and water. At the same time, U.S. Pat. No. 532,221 was issued to J. Thomas on Jan. 8, 1895 in which he additionally patented the driving and support mechanism for the revolving belts that were the subject of the first patent. In both patents the belts were open on the sides which created very complex problems with their sealing which has proven prohibitive. Therefore, the inventions covered by U.S. Pat. No. 532,220 and U.S. Pat. No. 532,221 have found little practical use.

Subsequent to the issuance of the above described patents, U.S. Pat. No. 1,258,428 was issued to J. B. Marling which generally disclosed a marine vessel which employed the use of a rotary bottom in which rows of hollow drums were fixed in tandem in the bottom of the vessel to reduce hydrodynamic drag. The design of this mechanism allow the rotationally attached plurality of drums to freely rotate as the boat moves through a body of water. Subsequent to the publication of this patent, it was discovered that the drums must be very large in diameter and the load speed also be relatively small to obtain the intended benefit of friction reduction. Since this design problem severely limited the usefulness of the invention, it has never made a significant impact on the design or construction of marine vessel hulls.

A method of producing a high speed boat is provided for in U.S. Pat. No. 1,913,605 issued to W. D. on Nov. 5, 1932 in which an endless belt that was attached to the bottom of the boat was used to propel the vessel. The proffered belt was straight in the width dimension and a plurality of air bags were fixed on the wetted side to provide the floating force. One major disadvantage of this design is that at high speed the air bags picked up a lot of water and splashes into the cargo area consuming extra energy and making the vessel less efficient. Additionally, the use of the belt for propulsion purposes is entirely contrary to the intended purpose of lessening the friction between the hull of the vessel and the body of water through which it is passing.

As a similar mechanism is provided for in U.S. Pat. No. 2,377,143 issued to J. V. Golden on Apr. 27, 1942 in which a revolving endless belt was used to form the bottom surface of a marine vessel in an attempt to overcome the drag created as it passed over a body of water. The problem with the design of this example of the prior art is that the belt must be sealed along its entire length along both sides which causes a great deal of friction which consumes a substantial amount of additional energy.

A similar conveyor system is covered by U.S. Pat. No. 3,205,852 issued to B. W. Shepard on Dec. 17, 1964 in which a conveyor forming the bottom of the hull of a marine vessel is used as the propulsion mechanism. The appreciable difference of this invention and the prior art is that it changed the drive and support mechanism of the W. D. Martin invention by allowing the variation of the angle of attack by the bottom of the boat. Again, the problem with this mechanism is that use of the belt for propulsion purposes, irrespective of its angle of attack, is entirely contrary to the intended purpose of lessening the friction between the hull of the vessel and the body of water through which it is passing.

In the continuing line of the review of the prior art, an endless belt system covered in U.S. Pat. No. 3,621,803 issued to R. E. Foster on Sep. 15, 1969 in which a plurality of such belts are provided with the intent of reducing the drag on the vertical sides of the hull of a marine vessel. With this intention, he introduced a plurality of endless belts in tandem to cover a large surface area and provided a workable mechanism to seal the opening on both sides of the belt. The primary problem with this approach to the problem is that the use the plurality of these endless belts is that the areas in front of, in between, and behind these areas can cause turbulence as they pass through the water which in turn create drag which reduces the efficiency of the vessel.

Finally, a method of modifying the dynamic interaction between water and the surface of a vessel is covered in U.K. Pat. No. 2,223,821 issued to Ian Roebuck on Apr. 18, 1990 in which the surface of a marine vessel is covered with a specially designed membrane. The invention operates to reduce drag and noise produced by the hull of a marine vessel passing through a body of water by providing, over a substantial portion of the hull, a flexible surface membrane and means of establishing a transverse displacement wave pattern in that membrane. The problem with this design is that it is very complicated and is therefore limited.

From the foregoing discussion it can be seen that it would be advantageous to provide a method of reducing the hydrodynamic drag that is created between the hull of a marine vessel and the body of water it is passing through as it moves. Additionally, that it would be advantageous to provide such a method that can be implemented over the substantial majority of the surface of the hull that comes into contact with the water in travel.

SUMMARY OF THE INVENTION

It is the primary objective of the present invention to provide a method of reducing the hydrodynamic drag that is created between the hull of a marine vessel and the contacting surface of the water it is passing through as it moves along its intended path.

It is an additional objective of the present invention to provide such a method that can be implemented over the substantial majority of the surface of the hull that comes into contact with the water during vessel operation.

It is a further objective of the present invention to provide such a method of producing a marine vessel with a hull design which significantly reduces the hydrodynamic drag on the vessel.

The objectives of the present invention are addressed to reduce the effects of hydrodynamic drag which accounts for an important portion of efficiency robbing resistance to marine vessels. The invention solves the problem of drag resistance for higher-speed marine vessels by providing a mechanism that will reduce or even eliminate the drag along the water-solid interface at the hull of the marine vessel. This mechanism is made up of a revolving elastic shell which is similar to a conveyer belt. However, this similarity ends in the fact that the belt is curled up on itself and sealed along the side edges to form a tubular apparatus which can be inflated with a gas to counter the hydrostatic pressure of the water outside.

This endless tubular belt that is used to form the hull of a marine vessel generally terminates just at the bow of the vessel and out front of the stern. This configuration leaves a hollow tube down the center of the hull which is capped off on either end to form a water-tight hull. Additionally, these caps are fitted with specially designed low friction skirts that interacts with the endless belt to form a water-tight seal and to prevent water from getting into the hull.

An interior frame is employed in the center tube chamber to provide a point of attachment for the engine and a platform for the carrying of cargo or personnel. This interior frame is suspended within the confines of the endless belt hull by the use of a plurality of rollers that are positioned against the inside of the belt in a manner which supports the frame while allowing the belt to rotate freely. The engine thus positioned is used as the propulsion device of the vessel and is generally connected by common means to a revolving propeller which provides the necessary thrust to move the vessel.

This endless elastic belt being so constructed is then free to revolve under the drag force created as the marine vessel travels forward through a body of water. This hydrodynamic drag force causes the belt to remain relatively stationary in relation to the surface of the water regardless of the direction of travel of the marine vessel or its speed in relation to the surface of the body of water. As a result of the linear velocity of the belt being equal to or slightly less than the speed of the vessel, there is little hydrodynamic drag resistence created between the hull of the vessel and the water surrounding it, which allows the vessel to both operate more efficiently and at higher rates of speed.

A drag-free thrust nozzle is also disclosed. This thrust nozzle uses an endless belt unit as described above which is housed within a rigid outer shell. The nozzle is also equipped with a propellor or similar drive means at its center. Thus, a more efficient nozzle than conventional fixed wall nozzles is disclosed.

For a better understanding of the present invention reference should be made to the drawings and the description in which there are illustrated and described preferred embodiments of the present invention.

DESCRIPTION OF THE PREFERRED EMBODIMENT

Figure 1:
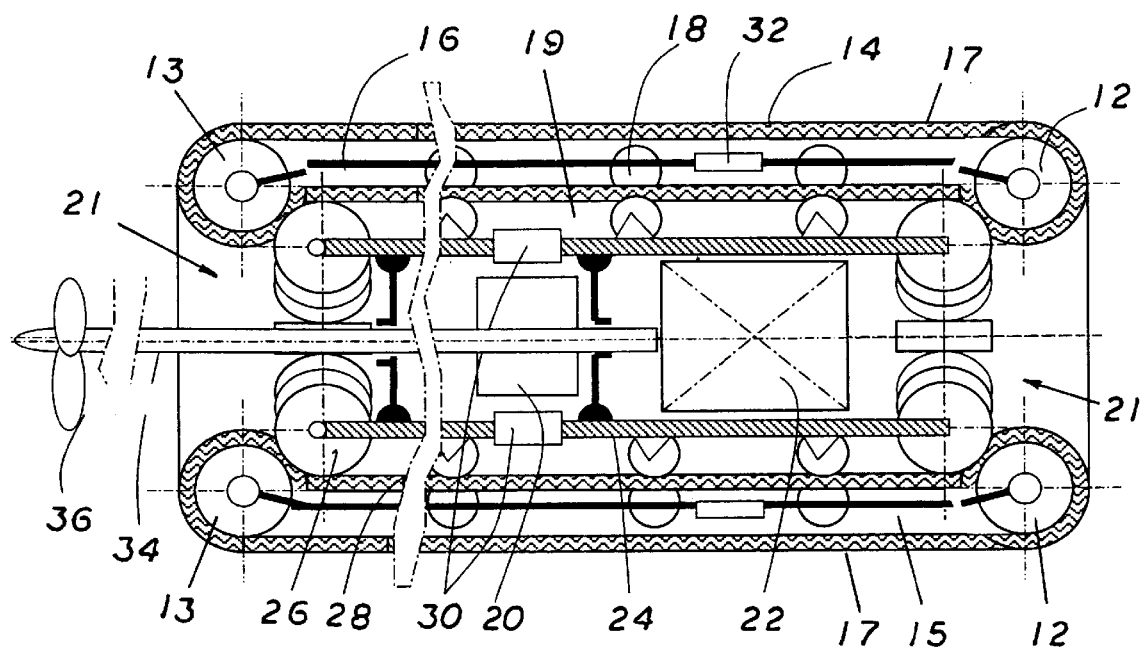
FIG. 1 is a cross-sectional view of the present invention which illustrates .the manner in which the endless belt is used to form the hull of a marine vessel and also how the internal frame is suspended and supported within this hull.

Referring now to the drawings, and more specifically to FIG. 1, the drag-free marine vessel 10 is made up of an endless tubular elastic revolving belt 14 as the major part of the wetted hull, or that portion of the present invention that is in direct contact with the body of water through which the drag-free marine vessel 10 is traveling. The tubular elastic revolving belt 14, which is endless in both its longitudinal and the transverse directions, can be thought of as being in form much the same as the outer skin of a donut that has been drastically stretched in its longitudinal axis thereby producing a long dual walled and revolving tube having an outer and inner tubular surface 17 and 19 respectively.

The endless revolving belt 14 is stretched on leading and trailing rollers 12 and 13 respectively which are fixed along the circumventure at the two ends of a tubular frame 16 which is all housed in the inner tubular chamber 15. To prevent the endless revolving belt 14 from touching the stationary tubular frame 16, a plurality of support rollers 18 are used to support the endless revolving belt 14 in between the leading rollers 12 along the substantial majority of the length of the drag-free marine vessel 10. The endless revolving belt 14 rotates as the drag-free marine vessel 10 travels through a body of water and as a result of this, there is little relative speed between the endless revolving belt 14 and the water that it is in contact with. As a result of this, hydrostatic drag between the invention and the water is effectively eliminated. Additionally, the endless revolving belt 14 can also be inflated with air to increase the invention's efficiency by counteracting the hydraulic pressure placed on it by the body of water through which it is traveling and to facilitate water tight sealing at both ends of the drag-free marine vessel 10.

The present invention is constructed in a manner which allows it to carry an engine 20 and additional payload 22 in a center tube chamber 21. In order to support the engine 20 and payload 22, a tubular shaped payload frame 24 is used which is supported by two sets of stretching rollers 26 and stretching roller wheels 28 which are positioned inside the area that is described by the leading rollers 12. The circumventure formed by the stretching rollers 26 is larger than that formed by the leading rollers 12 so that tubular frame 16 is securely contained inside the drag-free marine vessel 10. In this manner, the payload frame 24 can be suspended within the circumventure or center tube chamber 21 formed by the construction of the endless revolving belt 14 without affecting its rotational performance.

Tension in the belt can be adjusted and maintained by a set of hydraulic tensioning cylinders 30 on the payload frame 24 and sliding sockets 32 on the outer tubular frame 16. The tensioning cylinder 30 is to provide a method of varying the length of the payload frame 24 which can be used to adjust the tension of the stretching rollers within the endless revolving belt 14. Conversely, the sliding sockets 32 can also be employed to varying the length of the tubular frame 16 which is used to change the tension and performance of the endless revolving belt 14.

Finally, FIG. 1 also illustrates the manner in which the engine 20, which can be electrically or mechanically powered, is positioned within the payload frame 24 in a configuration which allows it to be connected to the propeller 36 of the present invention by the propeller shaft 34. As directional rotational force is supplied to the propeller 36 through the rotation of the internal components of the engine 20, the rotating propeller 36 drives the drag-free marine vessel 10 forward through the body of water. Conversely, the reversal of the direction of the propeller 36 rotation can be employed to pull the invention in a backwards fashion. Additionally, it goes without saying that any one of the number of currently available power sources can be used to power the invention.

Figure 2:
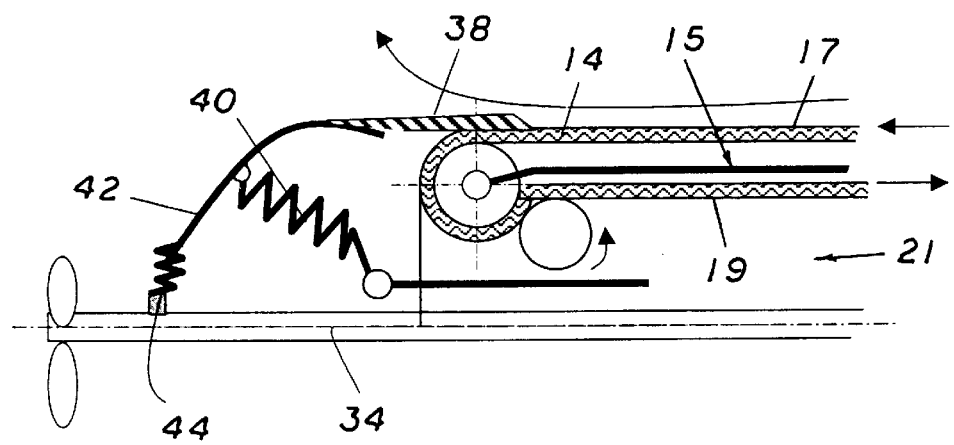
FIG. 2 is a cross-sectional detail view of rear quarter quadrant of the present invention as illustrated in FIG. 1 and illustrating the manner in which the hollow tube of the hull is sealed off by, the rear cap.
Figure 3:
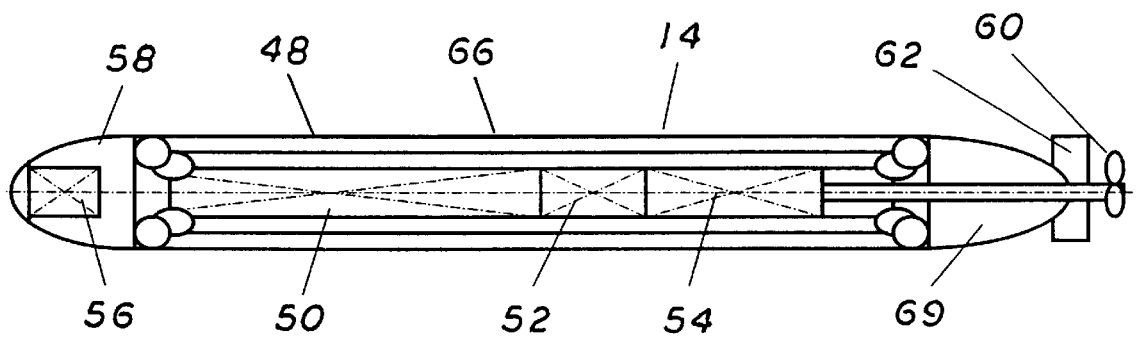
FIG. 3 is a top elevation cross-sectional view of an alternative embodiment of the present invention illustrating the manner in which the endless belt can be employed to form the hull of a submarine or torpedo.

The close-up detail of FIG. 2 is an illustration of the method used in sealing in the hydrodynamic tail 42 in its contact with the endless revolving belt 14. The sealing element employed is a Nylon skirt 38 which spans the gap between the hydrodynamic tail 42 and the endless revolving belt 14. The outward rim of the Nylon skirt 38, in relation to the hydrodynamic tail 42, is pressed against the endless revolving belt 14 to achieve the water tight seal. The pressure necessary to maintain this seal at the Nylon skirt 38 at the endless revolving belt 14 is the spring-loaded sealing mechanism 40 which internally spans the area between the hydrodynamic tail 42 and the remainder of the invention. The spring-loaded sealing mechanism 40 operates by placing an appropriate amount of outward pressure on the skin of the hydrodynamic tail 42 which in turn forces the Nylon skirt 38 against the endless revolving belt 14. Additionally, the pressure applied by the spring-loaded sealing mechanism 38 can be varied to compensate for differing water pressures and conditions enabling the present invention to operate efficiently in all types of environments. Finally, this figure shows the use of a bellows section 44 as part of the hydrodynamic tail 42, this bellows section 44 forms a seal between the propeller shaft 34 and the hydrodynamic tail 42.

An additional design feature of the present invention that enhances the Nylon skirt 38 in its sealing capacity is that the interior of the hydrodynamic tail 42 is pressurized, in much the same fashion as the interior of the endless revolving belt 14, with the appropriate air pressure so as to counteract hydraulic pressure applied to the exterior of the invention by the body of water through which it is traveling. Therefore, the junction of the hydrodynamic tail 42 and the endless revolving belt 14 is designed in such a fashion so as to prevent water from entering the interior of the invention without affecting the operation of endless revolving belt 14. Although the above describes the manner in which the rear end of the present invention is sealed, the front end is configured and sealed in the same fashion.

The tubular nature of the present invention translates well to the use with a submarine 48 as the interior of the tube leaves the necessary space for the positioning of the submarine engine and transmission, 52 and 54, and for the carrying of a submarine payload 50. The submarines 48 sensors and navigation electronics 56 are located in the submarine's hydrodynamic nose 58 which is constructed and sealed in much the same manner as the corresponding components described above. Additionally, submarine's tail 64 is also constructed in this manner and provides the point of attachment for the aft submarine propeller 60 and submarine rudder 62 which operate together to provide the thrust and direction control for the submarine 48. Finally, the ratio of length of the submarine's drag-free hull 66 to its diameter has been found to be larger than 10 in order to benefit from the invention's design.

Figure 4:
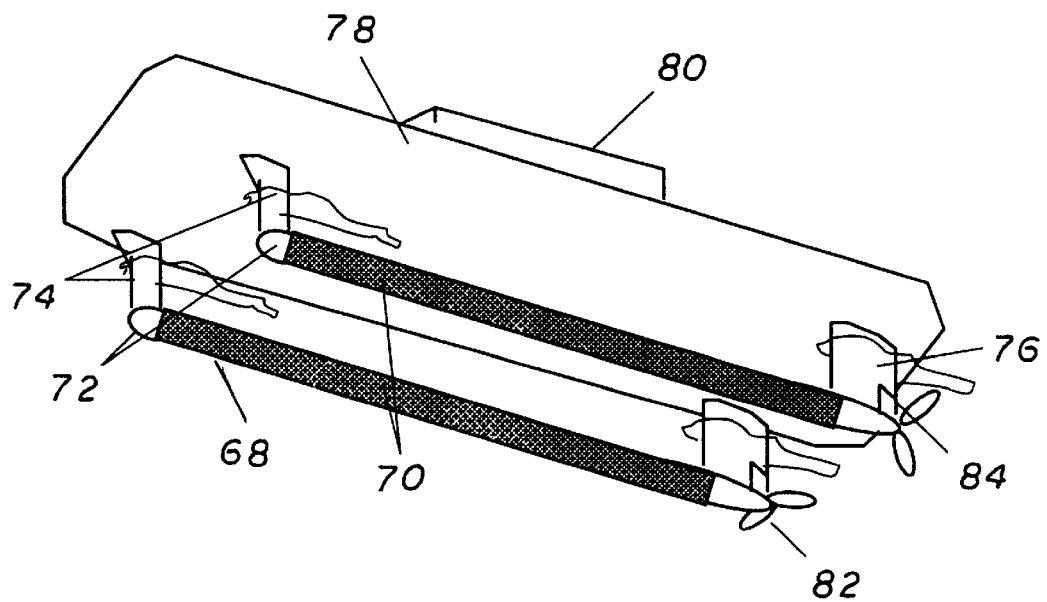
FIG. 4 is a perspective view of an alternative embodiment of the present invention illustrating a catamaran type configuration employing two drag-free vessels as the submerged or partially submerged floats.

In a still further embodiment of the present invention as illustrated in FIG. 4 illustrates shows a SWATH vessel, or a semi-submerged catamaran, using the drag-free vessels 10 as the submerged hulls of the catamaran ship 68. This embodiment of the present invention is made up of two submerged drag-free vessels 70 with forward and aft sealing caps 72 which are constructed in the same manner as the similar objects described above. These submerged drag-free vessels 70 are connected to a cargo platform 78 by the forward and aft struts, 74 and 76. The cargo platform 78 forms the body of the catamaran ship 68 and also allows for the positioning of the cargo cabin 80 from which the catamaran ship 68 is controlled. Each of the submerged drag-free vessels 70 of this embodiment are equipped with an aft propeller 82 and a port rudders 84. These components provide propulsion and steering impetus used by the operator to control the catamaran ship 68.

Additionally, the method employed to attach the forward and aft struts, 72 and 74, to the submerged drag-free vessels 70 are connected to the payload frame 24 (much the same configuration as illustrated in FIG. 1) in the submerged drag-free vessels 70. Additionally, all the forward and aft struts, 74 and 76, have a hydrodynamic cross sections to minimize fluid resistance so as to limit their drag related impact on the operation of the invention. Finally, the power to drive the catamaran ship 68 is transmitted through the aft struts 76 into the propellers 82 via axis and two sets of umbrella gears. It has been demonstrated that the tension in the belt has to be min. Ten (10) to the power of five (5) N/M in order to operate at a speed higher than 50 km per second nozzle water speed.

Figure 5:
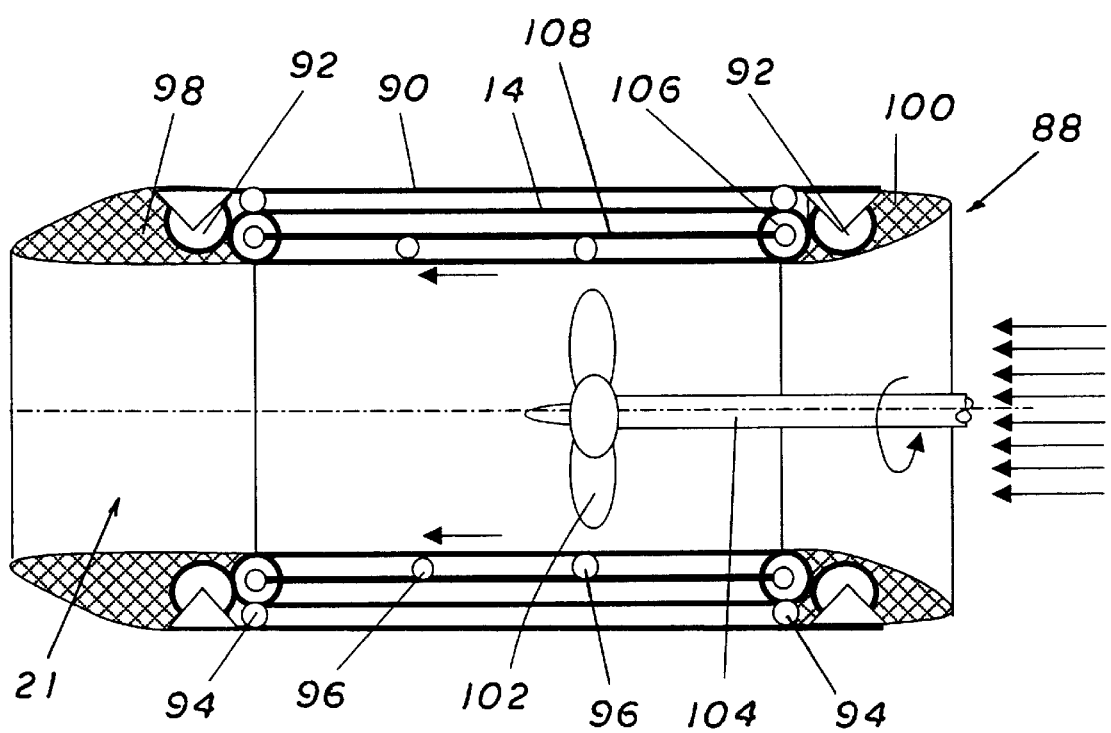
FIG. 5 is a top elevation cross-sectional view of an alternative embodiment of the present invention illustrating a marine propulsion nozzle constructed with the drag-free design to form the drag-free nozzle.

A still further embodiment of the present invention is illustrated in FIG. 5 in which a drag-free thrust nozzle 88 for marine vessels is described. A thrust nozzle 88 is used to enclose the propeller 102 of a marine vessel to increase the propeller's 102 efficiency. This FIG. illustrates a typical drag-free thrust nozzle 88 in which an endless revolving belt 14 is fitted to an outer tubular shell 90 by a set of outer retaining rollers 92 and outer support rollers 94. The endless revolving belt 14 is also fitted to an inner tubular frame 108 by a set of inner retaining rollers 106 and inner support rollers 96. The outer and inner support rollers, 92 and 94, also serve to position the endless revolving belt in relation to the outer tubular shell 90. Finally, the inner support rollers 96 are also used to counter the hydraulic pressure placed on the body of the endless revolving belt 14 as water passes through the body of the present invention.

The drag-free thrust nozzle 88 is also equipped with a hydrodynamically shaped inlet 100 and hydrodynamically shaped outlet 98 which are provided to seal the gaps at either end of the endless revolving belts 14. The sealing function of the hydrodynamic inlet and outlet, 100 and 98, are accomplished in the same manner as described above for the previous embodiments of the present invention. The nozzle propeller shaft 104 enters the thrust nozzle 88 at its forward end from an external drive source and is connected to the nozzle propeller 102 just forward of the longitudinal center of the thrust nozzle 88 and along its axial center. The force supplied by the nozzle propeller shaft 104 rotationally drives the nozzle propeller 102 within the body of the invention drawing water in through the front of the thrust nozzle 88 and forcing out the back. Additionally, the drag-free thrust nozzle 88 and the propeller 102 are preferably connected to and supported by the hull of the marine vessel which they are being used to propel.

In the past, the length of a thrust nozzle 88 had to be relatively short to limit the friction loss inside of it. The use of drag-free design of this embodiment of the present invention ensures that there is little relative speed between the water in the thrust nozzle 88 and the interior wall of the thrust nozzle 88 itself. Therefore, there is little or no efficiency loss as a result of friction and the thrust nozzle 88 can be made longer and more energy efficient compared with existing fixed wall nozzles.

Although the present invention has been described in considerable detail with reference to certain preferred versions thereof, other versions are possible. Therefore, the spirit and scope of the appended claims should not be limited to the description of the preferred versions contained herein.

What is claimed is:

1. A marine vessel unit comprising:

a plurality of leading rollers and a plurality of trailing rollers;

an internal framework for connecting said leading rollers to said trailing rollers so as to form a substantially tubular structure;

and an endless revolving belt covering said rollers and said framework such that said endless revolving belt defines an outer tubular surface on the outer portion of said tubular structure and an inner tubular surface on the inner portion of said tubular structure, said endless revolving belt being movable about said rollers and framework such that the outer tubular surface moves from said leading roller toward said trailing rollers and said inner tubular surface moves from said trailing rollers toward said leading rollers and said inner tubular surface defining a center tube chamber;

said endless revolving belt further defining a substantially fluid-tight inner chamber housing said tubular structure; and a forward and rear sealing skirt in slidable contact with the outer tubular surface of said endless revolving belt.

2. A marine vessel unit as in claim 1 further comprising a payload and power unit section within said center tube chamber.

3. A marine vessel unit as in claim 2 further comprising a forward and rear hydrodynamically shaped section connected to said payload section so as to seal said payload section in a substantially fluid-tight manner.

4. A marine vessel unit as in claim 3 further comprising a power drive connected to said power unit and extending outward through a bellow section.

5. A marine vessel unit as in claim 4 wherein said endless revolving belt forms the outer hull of a marine vessel.

6. A marine thrust nozzle comprising:

a plurality of leading rollers and a plurality of trailing rollers;

an internal framework for connecting said leading rollers to said trailing rollers so as to form a tubular structure;

an endless revolving belt covering said rollers and said framework such that said endless revolving belt defines an outer tubular surface on the outer portion of said tubular structure and an inner tubular surface on the inner portion of said tubular structure said inner tubular surface defining a center tube chamber, said endless revolving belt further defining a substantially fluid-tight inner chamber housing said tubular structure;

a rigid outer tubular shell about the outer tubular surface of said endless revolving belt; and a plurality of outer supporting rollers rotatably connected to said outer tubular shell, said outer supporting rollers further being in rotatable contact with the endless revolving belt such that the endless revolving belt is supported by said outer supporting rollers.

7. A marine thrust nozzle as in 6 further comprising a propeller housed within said center tube chamber.

8. A marine thrust nozzle as in 7 further comprising a hydrodynamically shaped inlet and outlet ring attached to the rigid outer tubular shell.

\* \* \* \* \*